(12) United States Patent
Pawar et al.

(10) Patent No.: US 10,382,933 B2
(45) Date of Patent: Aug. 13, 2019

(54) SYSTEM AND METHOD FOR ESTABLISHING AN EMERGENCY CALL OVER A WIRELESS LAN NETWORK

(71) Applicant: RELIANCE JIO INFOCOMM LIMITED, Mumbai (IN)

(72) Inventors: Anil Pawar, Navi Mumbai (IN); Sagar Mishra, Navi Mumbai (IN)

(73) Assignee: RELIANCE JIO INFOCOMM LIMITED, Mumbai, Maharashtra (IN)

( * ) Notice: Subject to any disclaimer, the term of this patent is extended or adjusted under 35 U.S.C. 154(b) by 0 days.

(21) Appl. No.: 15/821,491

(22) Filed: Nov. 22, 2017

(65) Prior Publication Data

US 2018/0146359 A1   May 24, 2018

(30) Foreign Application Priority Data

Nov. 24, 2016 (IN) .............................. 201621040164

(51) Int. Cl.
*H04W 4/90* (2018.01)
*H04W 76/50* (2018.01)
*H04W 64/00* (2009.01)
*H04L 29/06* (2006.01)
*H04W 4/02* (2018.01)
(Continued)

(52) U.S. Cl.
CPC ............. *H04W 4/90* (2018.02); *H04L 65/105* (2013.01); *H04L 65/1016* (2013.01); *H04L 65/1023* (2013.01); *H04L 65/1069* (2013.01); *H04W 64/003* (2013.01); *H04W 76/50* (2018.02); *H04W 4/02* (2013.01); *H04W 4/80* (2018.02); *H04W 84/12* (2013.01)

(58) Field of Classification Search
CPC ....... H04W 40/20; H04W 48/08; H04W 4/24; H04W 64/00; H04W 76/12; H04W 4/90; H04W 88/08; H04W 76/50; H04W 84/12
See application file for complete search history.

(56) References Cited

U.S. PATENT DOCUMENTS 8,848,666 B2 * 9/2014 Keller ............... H04W 36/0022
370/331
2015/0365790 A1 * 12/2015 Edge ....................... H04W 4/90
455/404.2

(Continued)

*Primary Examiner* — Diane D Mizrahi
(74) *Attorney, Agent, or Firm* — Ladas & Parry, LLP

(57) ABSTRACT

Embodiments of the present invention relate to identifying and routing an emergency call for a user equipment to an emergency center, thereby establishing the emergency call with the emergency center over a wireless LAN network. The establishing of said emergency call is performed by a network entity and modules present therein. A P-CSCF module analyses a request for establishing the emergency call received from the user equipment, wherein the request comprises a destination emergency number, a subscriber identity and an access type through which the request is made. The P-CSCF module transmits a location retrieval request to a PCRF module for retrieving a location information of the user equipment. Subsequently, an E-CSCF module receives a routing information from a LRF module based on the location information, pursuant to which the E-CSCF module routes the emergency call to the emergency center and establishes the emergency call with the emergency center.

7 Claims, 3 Drawing Sheets

(51) Int. Cl.
*H04W 84/12* (2009.01)
*H04W 4/80* (2018.01)

(56) References Cited

U.S. PATENT DOCUMENTS

| | | | |
|---|---|---|---|
| 2016/0021523 A1* | 1/2016 | Mahendran | H04L 29/12594 |
| | | | 455/404.1 |
| 2017/0005914 A1* | 1/2017 | Edge | H04W 4/90 |
| 2018/0184277 A1* | 6/2018 | Suzuki | H04W 4/90 |
| 2018/0227419 A1* | 8/2018 | Stojanovski | H04L 65/1016 |

* cited by examiner

SYSTEM AND METHOD FOR ESTABLISHING AN EMERGENCY CALL OVER A WIRELESS LAN NETWORK

CROSS-REFERENCE TO RELATED APPLICATION

This application claims the benefit of and priority to Indian Patent Application No. 201621040164 filed on Nov. 24, 2016, the disclosure of which is hereby incorporated herein by reference in its entirety

TECHNICAL FIELD

Embodiments of the present disclosure generally relate to wireless communication networks. More particularly, embodiments of the present disclosure relate to a system and a method for establishing an emergency call over a wireless Local Area Network (LAN) network.

BACKGROUND

An exemplary case of a typical Heterogeneous Network (HetNet) comprises a plurality of suitable powered macrocells for providing wide coverage range in sufficiently large areas. However, deployment of such macrocells may suffer quick capacity degradation as the number of user equipment operating in the macrocells coverage areas increases. Therefore, operators are also, now reinforcing the macrocells deployment along with at least one Wi-Fi placed at multiple strategic locations within one or more macro coverage areas. This kind of reinforced cellular network is generally termed as Heterogeneous network (herein after referred to as HetNet). Further a typical HetNet, reinforced with small cells placed at multiple strategic locations, not only provides increased mobile data capacity but also provides better mobile coverage, thereby enhancing the overall user's mobile broadband experience. The strategic location may include, but not limited to, areas having high density of users (such as shopping malls, airports, railway/bus stations and colleges), dead-spot areas, areas with low macro signal strength (such as indoor establishments) and peripheral locations of a macro coverage area.

In recent years, wireless technologies based on IEEE 802.11 standards, specifically the Wi-Fi technology, have undergone tremendous growth and commercialization. Presently, nearly all available user equipments (UE) with cellular capability support are now been integrated with the Wi-Fi in order to connect with all the available Wi-Fi networks operating in various unlicensed frequency bands including, but not limiting to, 2.4 GHz and 5 GHz. Such advancements in the Wi-Fi technologies therefore, have been playing a motivating role for cellular operators in usage of ubiquitous and cost-effective Wi-Fi technology while pursuing their HetNet strategy. Accordingly, a number of operators are now deploying low powered Wi-Fi cells along with cellular small cells at multiple strategic locations identified for the HetNet.

In an exemplary embodiment, a typical HetNet comprises a macro base station for providing wide area coverage to service users. Within the macro cell coverage, a plurality of low power nodes are being employed in service areas having a higher density of users requiring high data rates, wherein the low power nodes comprise micro cells that are integrated with Wi-Fi radio to provide multi-technology hotspot capacity/coverage goals. Alternatively, the operators could deploy independent and cost-effective Wi-Fi Access points in hotspot areas in order to offload cellular load, thereby sufficing with capacity/coverage requirements of users. Further, in the HetNet, the macro base station coverage may be used for wide area overlay mobility coverage, while the micro base stations along with coverage of the Wi-Fi access points may be used for upgrading the mobile capacity.

Further, the 3rd Generation Partnership Project (3GPP) standard particularly outlines two types of access i.e. trusted and untrusted non-3GPP access, wherein the non-3GPP access includes, but not limited to, the access from Wi-Fi, Worldwide Interoperability for Microwave Access (Wi-MAX), fixed and Code Division Multiple Access (CDMA) networks, while the trusted non-3GPP Wi-Fi access was first introduced with the long Term Evolution (LTE) standard in 3GPP Release 8 (2008). The trusted access is usually anticipated to be an operator-built Wi-Fi access with encryption in the Wi-Fi radio access network (RAN) and a secure authentication method. Particularly, in the trusted access, the user equipment is connected through a trusted wireless access gateway (TWAG) in the Wi-Fi core, wherein the TWAG is in turn connected directly with a packet gateway in the evolved packet core (EPC) through a secure tunnel (such as GPRS (General Packet Radio Service) Tunneling Protocol Computing (GTP), Mobile Internet protocol (MIP) or Proxy Mobile IP (PMIP)). On the other hand, the untrusted model was first introduced in the Wi-Fi specification in 3GPP Release 6 (2005). In the untrusted access, the operator has no control over the Wi-Fi access points such as public hotspots, subscribers' home Wi-Fi and Corporate Wi-Fi. Therefore, such untrusted Wi-Fi access points do not provide sufficient security mechanisms such as authentication and radio link encryption. Furthermore, the untrusted model requires no changes to the Wi-Fi RAN (Radio Access Network) but has an impact on the device side which requires an Internet Protocol Security (IPSec) client in the device, wherein the device is connected directly to the evolved packet data gateway (ePDG) in the Evolved Packet Core (EPC) through a secure IPSec tunnel. The Evolved Packet Data Gateway (ePDG) is connected to the Packet Gateway (P-GW) where each user session is transported through a secure tunnel (GTP or PMIP).

Considering the flaws and limitations in the non-trusted Wi-Fi access, the telecom service operators are considering a green field deployment of trusted Voice Over Wi-Fi (VoWiFi) solution to enable any Subscriber Identification Module (SIM) subscriber to make/receive an emergency call (video or voice) from any un-trusted/un-managed WiFi access such as the Voice over Long-Term Evolution (VoLTE) emergency calls. Therefore, the operators are proposing to offer these VoWiFi emergency services for SIM based subscribers locally over any un-trusted/un-managed Wi-Fi environment. Further, there have been spurt of emergency incidents across the globe and threatening environment and therefore, there has been a demand from the users and the investigators for an emergency alert mechanism on the devices. While conventional techniques may be available on many of the user equipments on other wireless channels there are no mechanism to identify an emergency call on the WiFi channel and route the same to the nearest local authorities/emergency centers to respond and help the victims in emergency situations. The location information is critical for two main reasons in emergency services. The initial purpose of the location information is to enable the IP Multimedia Subsystem (IMS) network to determine which public-safety answering point (PSAP) serves the area where the UE is currently located, so that the IMS network can route the emergency call to the correct PSAP. The second purpose is for the PSAP to get more accurate or updated location information for the terminal/device during or after the emergency session required by local authorities to ascertain the facts of the emergency incidence.

Accordingly, in order to overcome the aforementioned problems inherent in the existing solutions for establishing an emergency call over a wireless LAN network, there exists a need of an efficient mechanism to facilitate VoWiFi emergency services for the SIM based subscribers of the user equipments (registered VoWiFi among various clusters of WiFi) locally over any un-trusted/un-managed Wi-Fi network.

SUMMARY

This section is provided to introduce certain objects and aspects of the present disclosure in a simplified form that are further described below in the detailed description. This summary is not intended to identify the key features or the scope of the claimed subject matter.

Embodiments of the present disclosure may relate to a method for establishing an emergency call over a wireless local area network (LAN) network, the method being performed by a network entity, the method comprising: receiving, by a proxy call session control function (P-CSCF) module, a request for establishing the emergency call from the user equipment, wherein the request comprises a destination emergency number, a subscriber identity and an access type through which the request is made; analyzing, by the P-CSCF module, the request received from the user equipment; transmitting a location retrieval request to a policy and charging rule function (PCRF) module in an event the destination emergency number matches with a pre-configured list of emergency numbers and the access type belongs to the wireless LAN, wherein the location retrieval request is transmitted by the P-CSCF module; receiving a location information of the user equipment from the PCRF module, wherein the location information is received by the P-CSCF module; receiving a routing information from a location retrieval function (LRF) module, wherein the routing information is received by an emergency call session control function (E-CSCF) module based on the location information of the user equipment, the routing information is received based on a request transmitted by the E-CSCF module to the LRF module, and the routing information is received based on the comparison of the destination emergency number with the pre-configured list of emergency numbers; and routing the emergency call to an emergency center based on the routing information to establish the emergency call, wherein the emergency call is routed by the E-CSCF module.

Further, the embodiments of the present disclosure encompass a network entity for establishing an emergency call over a wireless local area network (LAN) network, the network entity comprising: a proxy call session control function (P-CSCF) module configured to: receive a request for establishing the emergency call from the user equipment, wherein the request comprises a destination emergency number, a subscriber identity and an access type through which the request is made, analyze the request received from the user equipment, and transmit a location retrieval request to a policy and charging rule function (PCRF) module in an event the destination emergency number matches with a pre-configured list of emergency numbers and the access type belongs to the wireless LAN, wherein the location retrieval request is transmitted by the P-CSCF module; the PCRF module configured to transmit a location information of the user equipment to the P-CSCF module; an emergency call session control function (E-CSCF) module configured to receive the location information from the P-CSCF module; and a location retrieval function (LRF) module configured to transmit a routing information to the E-CSCF module, wherein the routing information is transmitted based on a request received from the E-CSCF module, the routing information is transmitted based on the location information of the user equipment, and the routing information is transmitted based on the comparison of the destination emergency number with the pre-configured list of emergency numbers, wherein the E-CSCF module is configured to route the emergency call to an emergency center based on the routing information to establish the emergency call.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components.

DETAILED DESCRIPTION

Figure 1:
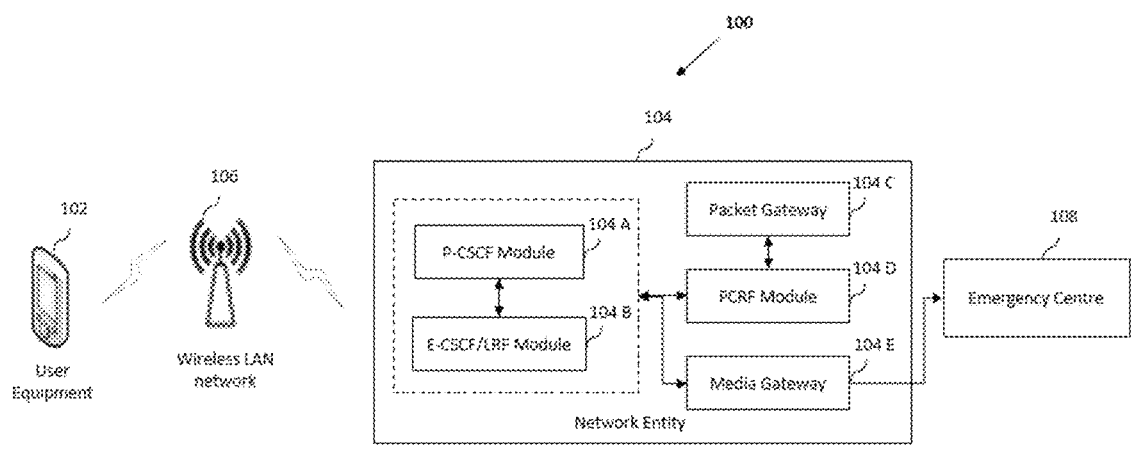
FIG. 1 illustrates an exemplary system architecture [100] for establishing an emergency call over a wireless LAN network, in accordance with an embodiment of the present disclosure.

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present disclosure are described below, as illustrated in various drawings in which like reference numerals refer to the same parts throughout the different drawings.

Embodiments of the present disclosure may relate to a system and method for establishing an emergency call over a wireless LAN network, wherein multiple Wi-Fi small cells, either separate or integrated, are deployed at various hotspot locations under a macro coverage area. Particularly, the system is configured to identify and route the emergency call for the voice over WiFi (VoWiFi) user equipments in a HetNet, wherein the user equipments may be registered to VoWiFi among various clusters of WiFi operating under a designated macro coverage area. The system comprises the user equipment, a network entity and an emergency center, wherein the user equipment and the network entity are connected to each other through a wireless LAN network, and the network entity is further connected to the emergency center through a media gateway. The network entity is configured to receive a request for establishing the emergency call from the user equipment, wherein the request comprises a destination emergency number, a subscriber identity and an access type through which the request is made. The network entity is configured to analyze said request to further retrieve location information and routing information of the user equipment. Finally, the network entity is configured to route the emergency call to an emergency center based on the routing information to establish the emergency call.

The "emergency number" as used herein may include, but not limited to, a destination number of the nearest emergency situation-handling institutions/centers such as police station, hospitals, fire brigades, etc. for receiving the emergency call from the user.

The "network entity" as used herein may comprise of one or more components of an IMS network, wherein said components may include, but not limited to, P-CSCF module, an E-CSCF/LRF module, a packet gateway (PGW), a PCRF module and a media gateway. The network entity may refer to one of an Evolved Node B (eNodeB), a Base Transceiver Station (BTS), Base Station Controller (BSC) and a Radio Network Controller (RNC). Further, the network entity may communicate to the user equipment through the wireless LAN network.

The "user equipment" as used herein may include, but not limited to, a smart phone, a feature phone, a tablet, a phablet and any such device obvious to a person skilled in the art. Further, the user equipment may comprise an input means such as a keyboard, an operating system, a memory unit, a display interface, etc.

The "emergency center" or "PSAP (Public-Safety Answering Point)" as used herein may refer to a physical location where emergency telephone calls are received and then further routed to proper emergency services. The emergency center may comprise one or multiple emergency institutions The "gateway" as used herein may refer to a data communication device that is configured to provide a remote network with connectivity to a host network. Further, the gateway serves as the entry and exit point of a network such that all data routed inward or outward must first pass through and communicate with the gateway in order to use routing paths. Furthermore, the "media gateway" as used herein may refer to a translation device or service that is configured to convert media streams between telecommunication networks. Additionally, the media gateways enable multimedia communications across packet networks using transport protocols such as asynchronous transfer mode (atm) and internet protocol (IP).

As illustrated in FIG. 1, the present disclosure encompasses an exemplary system architecture [100] comprising, but not limited to, a user equipment [102], a wireless LAN network [106], a network entity [104] and an emergency center [108] in accordance with an embodiment of the present disclosure, wherein the network entity [104] comprises a Proxy Call Session Control Function (P-CSCF) module [104A], an Emergency Call Session Control Function/Location Retrieval Function (E-CSCF/LRF) module [104B], a packet gateway [104C], a Policy And Charging Rule Function (PCRF) module [104D] and a media gateway [104E].

The user equipment [102] transmits a request to the P-CSCF module [104A] of the network entity [104] in an event there is a handoff between 3GPP access and non-3GPP access and the user equipment [102] remains in the Long Term Evolution (LTE) radio network. In an embodiment, the user equipment [102] may receive a paging signal from a mobility management entity (as used hereinafter as "MME") for fetching location information of the user equipment [102]. The "MME" may be a control node of the LTE access network, wherein the Mobility Management Entity (MME) may be responsible for tracking and paging procedure such as retransmissions even when the user equipment [102] is in an idle mode. Further, the request comprises an emergency number from a preregistered WiFi network with which the user equipment [102] is registered.

The P-CSCF module [104A] may therefore, be configured to receive a request for establishing the emergency call from the user equipment [102], wherein the request comprises a destination emergency number, a subscriber identity and an access type through which the request is made.

The P-CSCF module [104A] may be further configured to analyze the request received from the user equipment [102] to determine whether or not the destination emergency number matches with a pre-configured list of emergency numbers and the access type belongs to the wireless LAN. In an event the destination emergency number matches with a pre-configured list of emergency numbers and the access type belongs to the wireless LAN, the P-CSCF module [104A] may transmit a location retrieval request to the PCRF module [104D], wherein the location retrieval request comprises identifying the emergency number and sending location request to the PCRF module [104D]. Therefore, in an embodiment, the location retrieval request may be an authorize/authenticate-request (AAR) message and is sent in case of dialed number is one of the emergency number only.

Subsequently, the PCRF module [104D] may be configured to transmit a location information of the user equipment [102] to the P-CSCF module [104A]. In an embodiment, the PCRF module [104D] may be configured to retrieve the location information of the user equipment [102] from the LTE radio network via the packet gateway [104C] and may send the location retrieve request to the packet gateway [104C] in a re-auth-request (RAR) message. The packet gateway [104C] may provide a location information of the user equipment [102] to the PCRF module [104D]. In an embodiment, the packet gateway [104C] provides the location information to the PCRF module [104D] in re-auth-answer (RAA) message. Further, the PCRF module [104D] transmits the location information to the P-CSCF module [104A]. In an embodiment, the PCRF module [104D] transmits the location information to the P-CSCF module [104A] in an authentication, authorization, and accounting (AAA) message.

Subsequent to receiving the location information of the user equipment [102] from the PCRF module [104D], the P-CSCF module [104A] may be configured to forward the location information to the E-CSCF [104B], wherein the location information may comprise a cell identity of LTE location. In an embodiment, the P-CSCF module [104A] may append the location information with the request received from the user equipment [102] before sending the location information to the E-CSCF module [104B].

Further, the LRF module and the E-CSCF module [104B] may internally communicate with each other and therefore, may be considered as a single module [104B], wherein the LRF is a database having mapping of location cell ID to nearest emergency center [108] and not any routing node. The E-CSCF module [104B] may be further configured to transmit a request for a routing information to the LRF module [104B] to which the LRF module [104B] may be configured to transmit the routing information to the E-CSCF module [104B]. In one embodiment, the routing information may be transmitted based on based on the location information of the user equipment [102], while in another embodiment, the routing information may be transmitted based on the comparison of the destination emergency number with the pre-configured list of emergency numbers. Finally, the E-CSCF module [104B] may be configured to route the emergency call to the emergency center [108] based on the routing information to establish the emergency call. In a given instance, the PCRF module [104D] may retrieve the location information of the user equipment [102] and may forward the location information to concerned authorities such as nearest police station, railway accident authority, fire stations etc. for providing a swift assistance to the user involved/facing emergency situations.

In addition, the network entity [104] may comprise a media gateway [104E] which is selected based on the routing information, wherein the media gateway [104E] may be configured to convert media streams between telecommunication networks and enable the multimedia communications across packet networks using various transport protocols.

Figure 2:
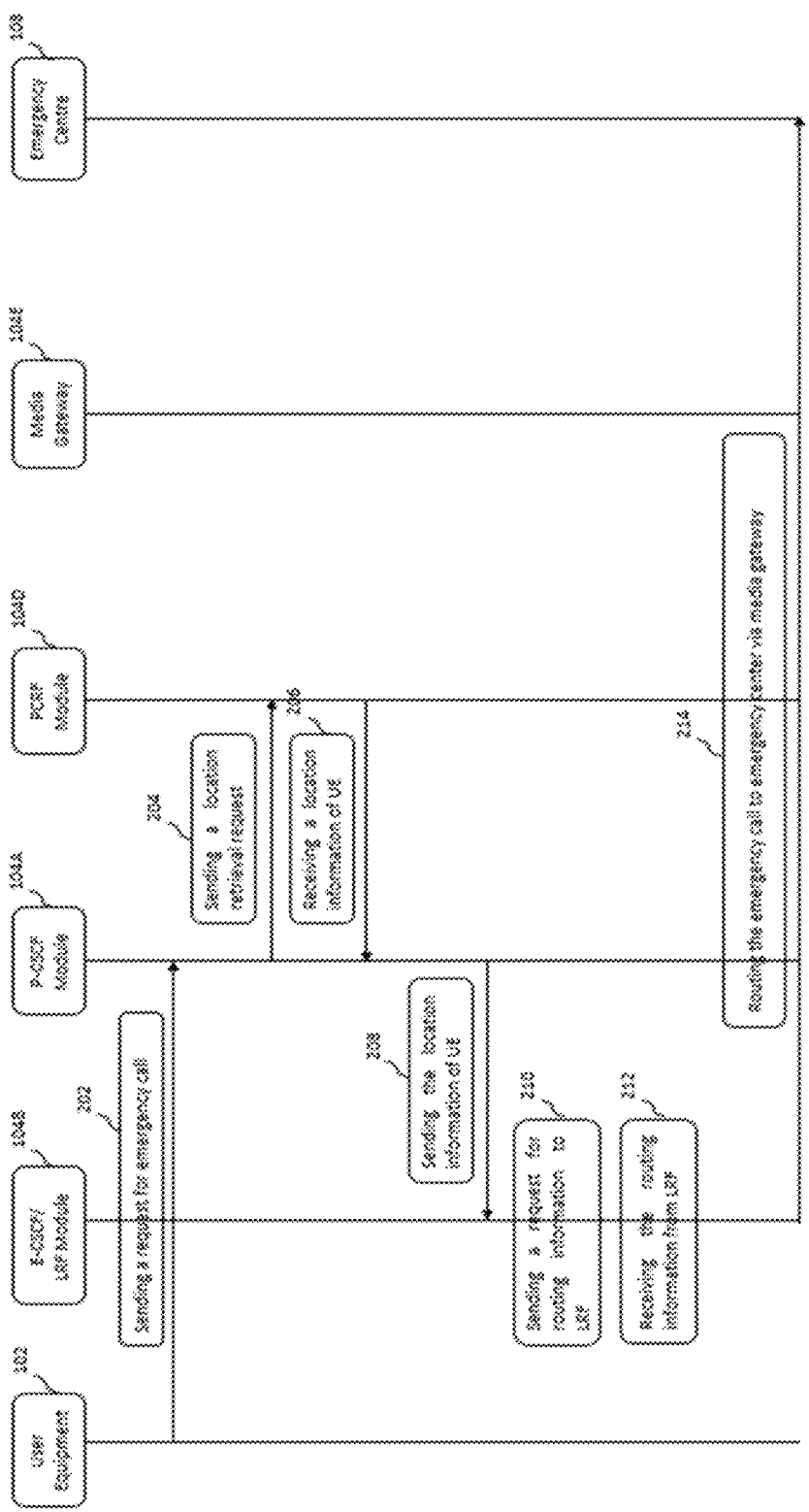
FIG. 2 illustrates an exemplary signaling diagram relating to establishment of an emergency call over a wireless LAN network, in accordance with an embodiment of the present disclosure.

As illustrated in FIG. 2, the present disclosure encompasses an exemplary signaling diagram relating to establishment of an emergency call over a wireless LAN network, in accordance with an embodiment of the present disclosure.

At step 202, the user equipment [102] transmits the request to the P-CSCF module [104A] of the network entity [104] in an event there is a handoff between the 3GPP access and the non-3GPP access and the user equipment [102] remains in the LTE radio network. In an embodiment, the user equipment [102] may receive the paging signal from the Mobility Management Entity (MME) for fetching the location information of the user equipment [102]. The P-CSCF module [104A] may therefore, be configured to receive a request for establishing the emergency call from the user equipment [102], wherein the request comprises the destination emergency number, the subscriber identity and the access type through which the request is made.

At step 204, the P-CSCF module [104A] may be configured to analyze the request received from the user equipment [102] to determine whether or not the destination emergency number matches with the pre-configured list of emergency numbers and the access type belongs to the wireless LAN. In an event the destination emergency number matches with the pre-configured list of emergency numbers and the access type belongs to the wireless LAN, the P-CSCF module [104A] may transmit the location retrieval request to the PCRF module [104D], wherein the location retrieval request comprises identifying the emergency number and sending location request to the PCRF module [104D]. Therefore, in an embodiment, the location retrieval request may be an authorize/authenticate-request (AAR) message and is sent in case of dialed number is one of the emergency number only.

At step 206, the PCRF module [104D] may be configured to transmit the location information of the user equipment [102] to the P-CSCF module [104A]. In an embodiment, the PCRF module [104D] may be configured to retrieve the location information of the user equipment [102] from the LTE radio network via the packet gateway [104C] and may send the location retrieve request to the packet gateway [104C] in a re-auth-request (RAR) message. Moreover, the packet gateway [104C] may provide the location information of the user equipment [102] to the PCRF module [104D]. In an embodiment, the packet gateway [104C] provides the location information to the PCRF module [104D] in re-auth-answer (RAA) message. Further, the PCRF module [104D] transmits the location information to the P-CSCF module [104A]. In an embodiment, the PCRF module [104D] transmits the location information to the P-CSCF module [104A] in an authorize/authenticate-answer (AAA) message.

At step 208, on receiving the location information of the user equipment [102] from the PCRF module [104D], the P-CSCF module [104A] may be configured to forward the location information to the E-CSCF [104B], wherein the location information may comprise the cell identity of LTE location. In an embodiment, the P-CSCF module [104A] may append the location information with the request received from the user equipment [102] before sending the location information to the E-CSCF module [104B].

At step 210, the LRF module and the E-CSCF module [104B] may internally communicate with each other and therefore, may be considered as a single module [104B], wherein the LRF is a database having mapping of location cell ID to nearest emergency center [108] and not any routing node. The E-CSCF module [104B] may be further configured to transmit a request for a routing information to the LRF module [104B].

At step 212, in response to receiving the routing information request from the E-CSCF module [104B], the LRF module [104B] may be configured to transmit the routing information to the E-CSCF module [104B]. In one embodiment, the routing information may be transmitted based on based on the location information of the user equipment [102], while in another embodiment, the routing information may be transmitted based on the comparison of the destination emergency number with the pre-configured list of emergency numbers.

At step 214, finally, the E-CSCF module [104B] may be configured to route the emergency call to the emergency center [108] based on the routing information to establish the emergency call.

Figure 3:
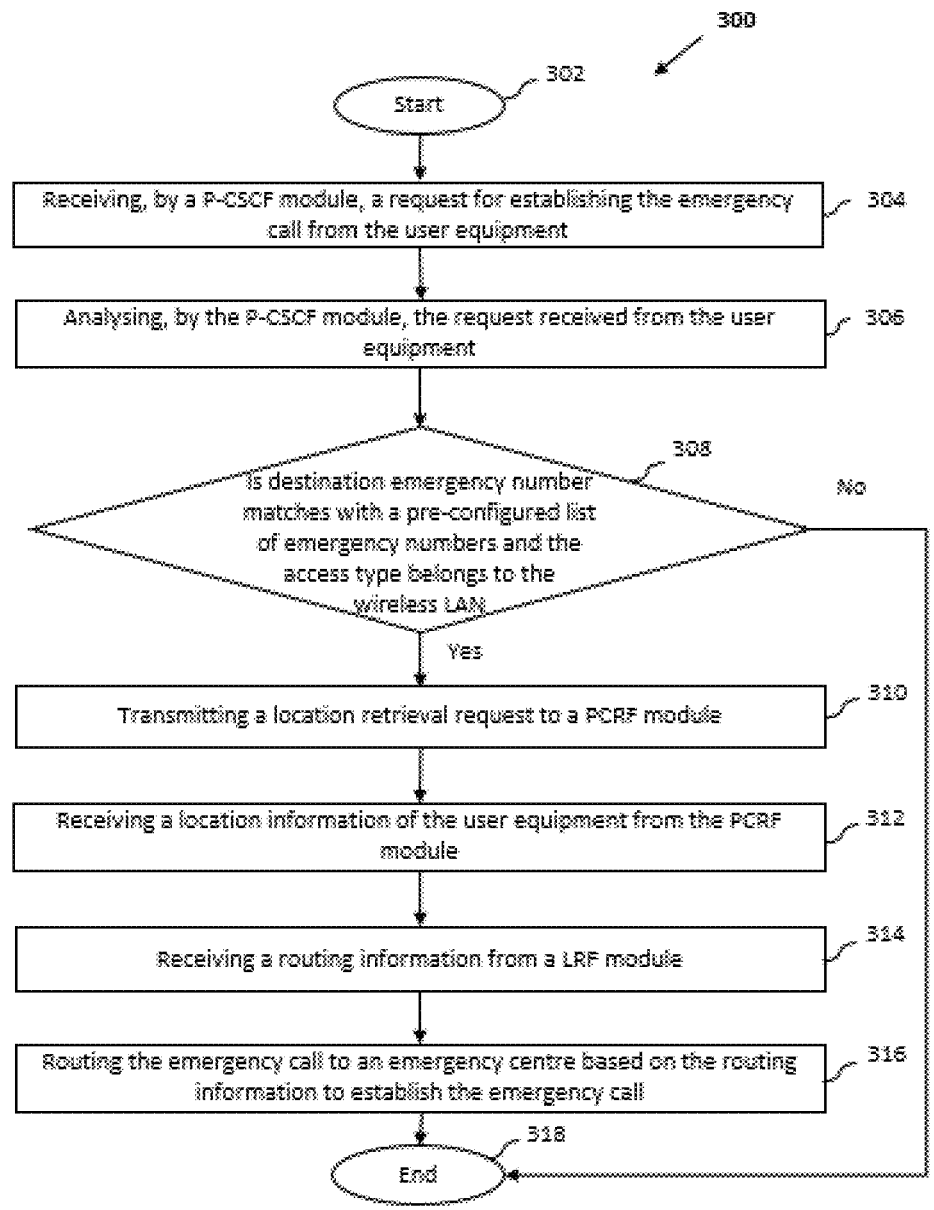
FIG. 3 illustrates an exemplary method flow diagram [300] for establishing an emergency call over a wireless LAN network, in accordance with an embodiment of the present disclosure.

As illustrated in FIG. 3, the present disclosure encompasses an exemplary method flow diagram [300] for establishing an emergency call over a wireless LAN network, in accordance with an embodiment of the present disclosure, wherein the method being performed by the network entity [104]. The method flow initiates at step 302.

At step 304, the P-CSCF [104A] module, of the network entity [104], receives the request from the user equipment [102] in an event there is a handoff between the 3GPP access and the non-3GPP access and the user equipment [102] remains in the LTE radio network. In an embodiment, the user equipment [102] may receive the paging signal from the MME for fetching the location information of the user equipment [102]. The P-CSCF module [104A] may therefore, be configured to receive a request for establishing the emergency call from the user equipment [102], wherein the request comprises the destination emergency number, the subscriber identity and the access type through which the request is made.

At step 306, the P-CSCF module [104A] may be configured to analyze the request received from the user equipment [102] to determine whether or not the destination emergency number matches with the pre-configured list of emergency numbers and the access type belongs to the wireless LAN.

At step 308, the P-CSCF module [104A] may determine whether the destination emergency number matches with the pre-configured list of emergency numbers and the access type belongs to the wireless LAN.

At step 310, in an event, the destination emergency number matches with the pre-configured list of emergency numbers and the access type belongs to the wireless LAN, the P-CSCF module [104A] may transmit the location retrieval request to the PCRF module [104D], wherein the location retrieval request comprises identifying the emergency number and sending location request to the PCRF module [104D]. Therefore, in an embodiment, the location retrieval request may be an authorize/authenticate-request (AAR) message and is sent in case of dialed number is one of the emergency number only. In an event, the destination emergency number does not match with the pre-configured list of emergency numbers and the access type does not belong to the wireless LAN, the method [300] may end at step 320.

At step 312, the PCRF module [104D] may be configured to transmit the location information of the user equipment [102] to the P-CSCF module [104A]. In an embodiment, the PCRF module [104D] may be configured to retrieve the location information of the user equipment [102] from the LTE radio network via the packet gateway [104C] and may send the location retrieve request to the packet gateway [104C] in a re-auth-request (RAR) message. Moreover, the packet gateway [104C] may provide the location information of the user equipment [102] to the PCRF module [104D]. In an embodiment, the packet gateway [104C] provides the location information to the PCRF module [104D] in re-auth-answer (RAA) message. Further, the PCRF module [104D] transmits the location information to the P-CSCF module [104A]. In an embodiment, the PCRF module [104D] transmits the location information to the P-CSCF module [104A] in an authorize/authenticate-answer (AAA) message. On receiving the location information of the user equipment [102] from the PCRF module [104D], the P-CSCF module [104A] may be configured to forward the location information to the E-CSCF [104B], wherein the location information may comprise the cell identity of LTE location. In an embodiment, the P-CSCF module [104A] may append the location information with the request received from the user equipment [102] before sending the location information to the E-CSCF module [104B].

At step 314, the LRF module and the E-CSCF module [104B] may internally communicate with each other and therefore, may be considered as a single module [104B], wherein the LRF is a database having mapping of location cell ID to nearest emergency center [108] and not any routing node. The E-CSCF module [104B] may be further configured to transmit a request for a routing information to the LRF module [104B]. In response to receiving the routing information request from the E-CSCF module [104B], the LRF module [104B] may be configured to transmit the routing information to the E-CSCF module [104B]. In one embodiment, the routing information may be transmitted based on based on the location information of the user equipment [102], while in another embodiment, the routing information may be transmitted based on the comparison of the destination emergency number with the pre-configured list of emergency numbers.

At step 316, finally, the E-CSCF module [104B] may be configured to route the emergency call to the emergency center [108] based on the routing information to establish the emergency call. Then, the method [300] may end at step 318.

The present invention further encompasses one or more interfaces used for retrieving the location information of the user equipment [102] from the LTE radio network via the packet gateway [104C].

The present invention encompasses a SWu interface for the user equipment [102] to communicate with a packet data gateway. The SWu interface is a secure interface to the user equipment [102] in the untrusted Wi-Fi access points. Such interface may carry Internet Protocol Security (IPSec) tunnels. Further, the Internet Key Exchange (IKEv2) protocol may be used to establish the IPSec tunnels between the user equipment [102] and the packet data gateway.

The present invention also encompasses a SWm interface for the packet data gateway to communicate with an authentication server. The SWm is the interface that may be used transport mobility parameters of the user equipment [102] and tunnel authentication and authorization data using an Extensible Authentication Protocol Method for Universal Mobile Telecommunications System (UMTS) Authentication and Key Agreement (EAP-AKA) method.

The present invention also encompasses a SWx interface for enabling the communication between the authentication server and a home server and may be used to transport mobility parameters of the user equipment [102] (such as the location information) and fetch user authorization data from the home server.

The present invention also encompasses a s2b interface that connects the packet gateway [104C] and the packet data gateway (ePDG) and may be based on GTP v2.10 protocol and used to establish WLAN sessions (for instance, an emergency call) for the user equipment [102].

The present invention encompasses a s6b interface for connecting the packet gateway [104C] with the authentication server and may be used to update the P-CSCF address to the home server when the user equipment [102] is attached on the untrusted Wi-Fi access points.

The units, interfaces, modules, and components depicted in the figures and described herein may be present in the form of a hardware, a software and a combination thereof. Connection/s shown between these units/components/modules/interfaces in the exemplary system architecture [100], the user equipment [102], the wireless LAN network [106], the network entity [104] and the emergency center [108] are exemplary. Further, any units/components/module/interface in the exemplary system architecture [100], the user equipment [102], the wireless LAN network [106], the network entity [104] and the emergency center [108] may interact with each other through various logical links and/or physical links. Further, the units/components/modules/interfaces may be connected in other possible ways.

Though a limited number of the user equipment [102], the wireless LAN network [106], the network entity [104] and the emergency center [108], units, interfaces, modules and components, have been shown in the figures; however, it will be appreciated by those skilled in the art that the exemplary system architecture [100], the user equipment [102], the wireless LAN network [106], the network entity [104] and the emergency center [108] of the present invention encompasses any number and varied types of the entities/elements such the user equipment [102], the wireless LAN network [106], the network entity [104] and the emergency center [108], the units, interfaces, modules and components.

While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

What is claimed is:

1. A method for establishing an emergency call over a wireless local area network (LAN), the method being performed by a network entity, the method comprising:
   establishing the emergency call utilizing the network entity, the network entity being selected from one of an E-ULTRAN Node B (eNodeB), a Base Transceiver Station (BTS), Base Station Controller (BSC) and a Radio Network Controller (RNC), wherein the establishing of said call comprises steps of:
      receiving, by a proxy call session control function (P-CSCF) module present within the network entity, a request to establish the emergency call from the user equipment, wherein the request comprises a destination emergency number, a subscriber identity and an access type through which the request is made;
      analyzing, by the P-CSCF module present within the network entity, the request received from the user equipment;
      transmitting a location retrieval request to a policy and charging rule function (PCRF) module present within the network entity, in an event the destination emergency number matches with a pre-configured list of emergency numbers and the access type belongs to the wireless LAN, wherein the location retrieval request is transmitted by the P-CSCF module;
      receiving a location information of the user equipment from the PCRF module, wherein the location information is received by the P-CSCF module;
      receiving a routing information from a location retrieval function (LRF) module present within the network entity, wherein
         the routing information is received by an emergency call session control function (E-CSCF) module present within the network entity, based on the location information of the user equipment,
         the routing information is received based on a request transmitted by the E-CSCF module to the LRF module, and
         the routing information is received based on the comparison of the destination emergency number with the pre-configured list of emergency numbers; and
      routing the emergency call to an emergency center based on the routing information wherein the emergency call is routed by the E-CSCF module present within the network entity;
      establishing the emergency call with the emergency center over the wireless local area network.

2. The method as claimed in claim 1, further comprising retrieving, by the PCRF module, the location information of the user equipment from a long term evolution (LTE) radio network via a packet gateway.

3. The method as claimed in claim 1, wherein the request comprises an emergency number from a preregistered WiFi network.

4. The method as claimed in claim 1, wherein the location retrieval request comprises identifying the emergency number and sending location request to the PCRF module.

5. A network entity for establishing an emergency call over a wireless local area network (LAN), the network entity comprising:
   the network entity that establishes the emergency call, the network entity being selected from one of an E-ULTRAN Node B (eNodeB), a Base Transceiver Station (BTS), Base Station Controller (BSC) and a Radio Network Controller (RNC), wherein the network entity further comprises:
      a proxy call session control function (P-CSCF) module present within the network entity which:
         receives a request to establish the emergency call from the user equipment, wherein the request comprises a destination emergency number, a subscriber identity and an access type through which the request is made,
         analyzes the request received from the user equipment, and
         transmits a location retrieval request to a policy and charging rule function (PCRF) module present within the network entity, in an event the destination emergency number matches with a pre-configured list of emergency numbers and the access type belongs to the wireless LAN, wherein the location retrieval request is transmitted by the P-CSCF module;
      the PCRF module which transmits a location information of the user equipment to the P-CSCF module;
      an emergency call session control function (E-CSCF) module present within the network entity, which receives the location information from the P-CSCF module; and
      a location retrieval function (LRF) module present within the network entity, which transmits a routing information to the E-CSCF module, wherein the routing information is transmitted based on a request received from the E-CSCF module,
         the routing information is transmitted based on the location information of the user equipment, and
         the routing information is transmitted based on the comparison of the destination emergency number with the pre-configured list of emergency numbers,
      wherein the E-CSCF module also
         routes the emergency call to an emergency center based on the routing information, and
         establishes the emergency call with the emergency center over the wireless local area network.

6. The network entity as claimed in claim 5, further comprising a media gateway which is selected based on the routing information.

7. The network entity as claimed in claim 5, wherein the PCRF module also retrieves the location information of the user equipment from a long term evolution (LTE) network using a packet gateway.

* * * * *